United States Patent
Maharaj et al.

(10) Patent No.: US 12,354,151 B2
(45) Date of Patent: Jul. 8, 2025

(54) AUTOMATIC ROUTING OF USER INQUIRIES USING NATURAL LANGUAGE AND IMAGE RECOGNITION MODELS

(71) Applicant: Maplebear Inc. (dba Instacart), San Francisco, CA (US)

(72) Inventors: Shaun Navin Maharaj, Vaughan (CA); Brent Scheibelhut, Toronto (CA); Mark Oberemk, Toronto (CA)

(73) Assignee: Maplebear Inc., San Francisco, CA (US)

( * ) Notice: Subject to any disclaimer, the term of this patent is extended or adjusted under 35 U.S.C. 154(b) by 285 days.

(21) Appl. No.: 18/064,129

(22) Filed: Dec. 9, 2022

(65) Prior Publication Data

US 2024/0193663 A1 Jun. 13, 2024

(51) Int. Cl.
 *G06Q 30/00* (2023.01)
 *G06Q 30/0601* (2023.01)
 *G06F 40/279* (2020.01)
 *G06V 10/764* (2022.01)

(52) U.S. Cl.
 CPC ....... *G06Q 30/0631* (2013.01); *G06F 40/279* (2020.01); *G06V 10/764* (2022.01)

(58) Field of Classification Search
 CPC ................................................ G06Q 30/0631
 See application file for complete search history.

(56) References Cited

U.S. PATENT DOCUMENTS

| | | | |
|---|---|---|---|
| 2018/0150897 A1* | 5/2018 | Wang | G06F 16/435 |
| 2020/0387763 A1 | 12/2020 | Bhardwaj et al. | |
| 2021/0142381 A1* | 5/2021 | Gutman | G06Q 30/0255 |
| 2024/0316575 A1* | 9/2024 | Yan | B05B 3/0422 |
| 2024/0354828 A1* | 10/2024 | Manrique | G06Q 30/0641 |

OTHER PUBLICATIONS

Tsai, Sam S., et al. "Mobile product recognition." Proceedings of the 18th ACM international conference on Multimedia. 2010.*
Canadian Intellectual Property Office, Office Action, CA Patent Application No. 3,213,729, Nov. 27, 2024, 5 pages.

* cited by examiner

*Primary Examiner* — Kathleen Palavecino
(74) *Attorney, Agent, or Firm* — Fenwick & West LLP

(57) ABSTRACT

A system or a method for using machine learning to automatically route user inquiries to a retailer are presented. The system receives an inquiry from a client device associated with a user. The inquiry includes text content and an image. The system uses a natural language model to analyze the received text to identify a first category of items. The system applies the received image to an image recognition model to identify a second category of items contained in the received image. The system then identifies a retailer that carries items in at least one of the first or second category of items, and suggests the retailer to the user via the client device associated with the user. A retail associate at the retailer can then respond to the inquiry via a client device associated with the retailer.

20 Claims, 9 Drawing Sheets

600

```
┌─────────────────────────────────────────────────────────────┐
│ Receive an inquiry from a client device associated with a   │
│ user, the inquiry comprising text content and an image      │
│                          605                                │
└─────────────────────────────────────────────────────────────┘
                              │
                              ▼
┌─────────────────────────────────────────────────────────────┐
│ Use a natural language model to analyze the received text   │
│ content to identify a first category of items               │
│                          610                                │
└─────────────────────────────────────────────────────────────┘
                              │
                              ▼
┌─────────────────────────────────────────────────────────────┐
│ Apply the received image to an image recognition model to   │
│ identify a second category of items                         │
│                          615                                │
└─────────────────────────────────────────────────────────────┘
                              │
                              ▼
┌─────────────────────────────────────────────────────────────┐
│ Identify a retailer that carries items in at least one of   │
│ the first or second category of items                       │
│                          620                                │
└─────────────────────────────────────────────────────────────┘
                              │
                              ▼
┌─────────────────────────────────────────────────────────────┐
│               Suggest the retailer to the user              │
│                          625                                │
└─────────────────────────────────────────────────────────────┘
```

FIG. 6

AUTOMATIC ROUTING OF USER INQUIRIES USING NATURAL LANGUAGE AND IMAGE RECOGNITION MODELS

BACKGROUND

An online concierge system is an online platform that connects users and retailers. A user can place an order for purchasing items, such as groceries, from participating retailers via the online concierge system, with the shopping being done by a personal shopper. After the personal shopper finishes shopping, the order is delivered to the user's address.

However, when a user has a question about a category of items or a problem to solve, existing online concierge systems often cannot provide assistance, and the user often has to conduct research themselves or contact particular retailers directly. For example, a user may have a lawn with patches. The user does not know what item they should purchase to cure the patches. The user might do some research online via search engines, ask some neighbors, or go to a special store to ask for help.

SUMMARY

In accordance with one or more aspects of the disclosure, an improved online concierge system may receive inquiries from users and may use machine learning to automatically route the inquiries to proper entities, such as shoppers with domain expertise and/or retailers that are likely to carry items associated with the users' inquiries.

One or more embodiments described herein are related to a method or a system for using machine learning to automatically route user inquiries to a retailer or a shopper. The system receives an inquiry from a client device associated with a user. The inquiry includes text content and an image. The system uses a natural language model to analyze the received text to identify a first category of items. The system applies the received image to an image recognition model to identify a second category of items contained in the received image. The system then identifies a retailer that carries items in at least one of the first or second category of items, and suggests the retailer to the user. In some embodiments, the system routes the received inquiry to a client device of the identified retailer.

In some embodiments, the natural language model is further configured to identify one or more particular items in the first category (also referred to as "first items"), and/or the natural language model is further configured to identify one or more particular items in the second category (also referred to as "second items"). The identification of the retailer is further based on the one or more first items and/or second items. In some embodiments, the system further uses a machine-learning item availability model to predict a likelihood of the one or more first items and/or second items being available at the retailer. The identification of the retailer is further based on the predicted likelihood of the first or second items being available at the retailer.

In some embodiments, identifying the retailer is further based on a profile of the user. The profile of the user contains information related to historical orders made by the user, or a delivery address of the user. In some embodiments, the system further predicts an item in the first or the second category of the items that the user is likely to purchase based on the text content or the image, and identifying the retailer is further based on a prediction of availability of the item at the retailer.

In some embodiments, the system is further configured to identify a shopper among a plurality of shoppers based on historical orders each of the plurality of shoppers have fulfilled, and route the received inquiry to a client device of the identified shopper. In some embodiments, the system is further configured to receive a recommendation from the client device of the identified shopper, recommending the retailer; and responsive to the recommendation, reroute the received inquiry to the client device of the retailer. In some embodiments, the system is further configured to receive a recommendation from the client device of the identified shopper, recommending a second shopper; and responsive to the recommendation, reroute the received inquiry to a client device of the second shopper.

In some embodiments, the profiles of the plurality of shoppers include historical orders that the plurality of shoppers have fulfilled, and identification of the shopper is based on the historical orders that the plurality of shoppers have fulfilled. In some embodiments, the profiles of the plurality of the shoppers include expertise scores associated with the first or second categories of items, and identification of the shoppers is based on the expertise scores associated with the first or second categories of items.

In some embodiments, for each of the plurality of shoppers, the system assigns the shopper an expertise score associated with at least one of a plurality of categories of items. In some embodiments, the expertise score of a shopper associated with a particular category of items is assigned based on at least one of (1) a number of successful orders completed for a particular retailer that carries the particular category of items, (2) a frequency of successful orders completed for a particular retailer that carries the particular category of items, (3) a number of successful orders completed for the particular category, (4) a frequency of successful orders completed for the particular category, (5) a number of shopper recommendations associated with the particular category of items that are approved by users, and/or (6) a frequency of shopper recommendations associated with the particular category of items are approved by users.

BRIEF DESCRIPTION OF THE DRAWINGS

FIG. 6 is a flowchart of an example method for suggesting a retailer based on a user inquiry, according to one or more embodiments.

Figure 1:
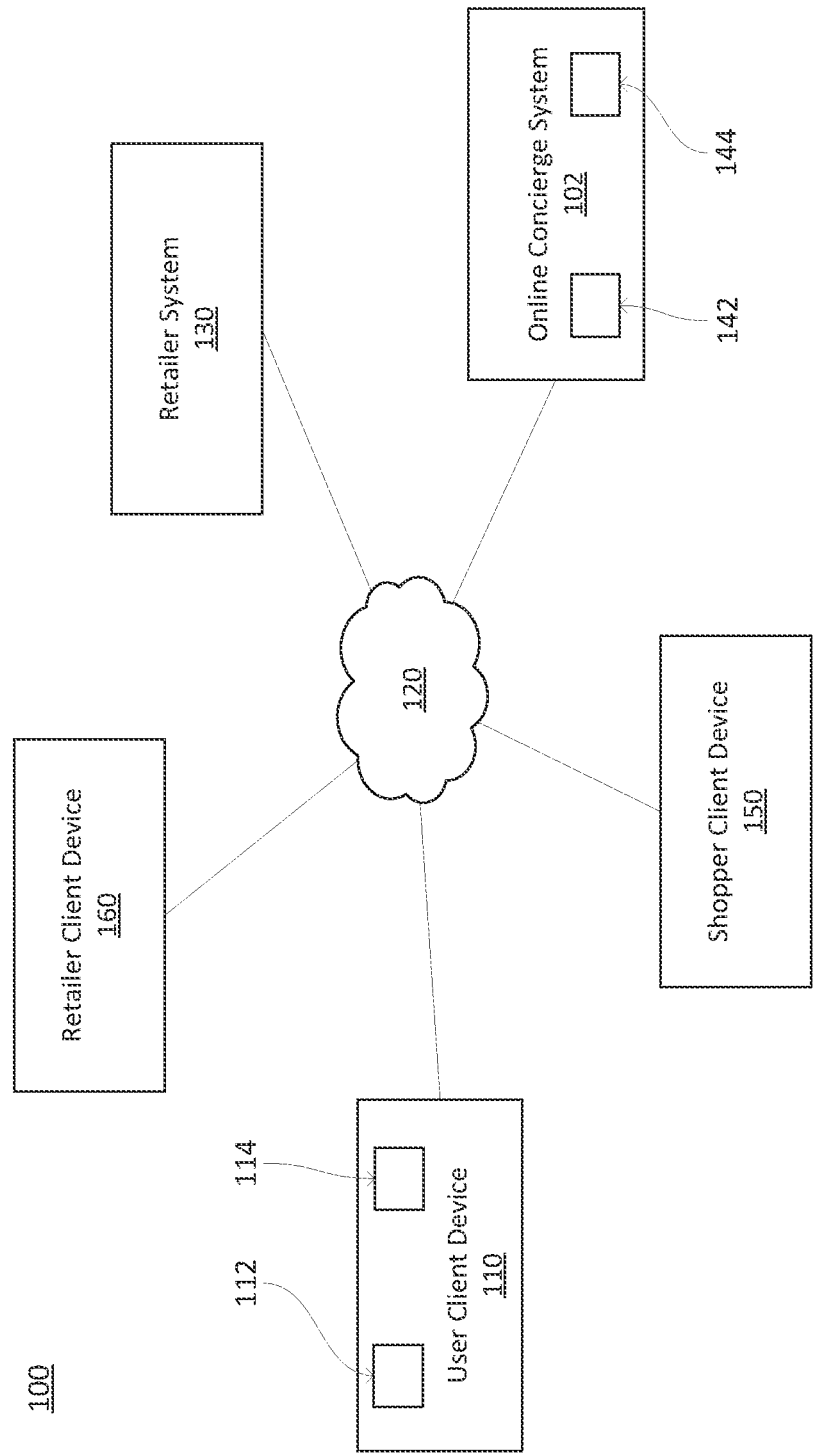
FIG. 1 is a block diagram of a system environment in which an online system, such as an online concierge system, operates, according to one or more embodiments.

The figures depict embodiments of the present disclosure for purposes of illustration only. Alternative embodiments of the structures and methods illustrated herein may be employed without departing from the principles, or benefits touted, of the disclosure described herein.

DETAILED DESCRIPTION

In accordance with one or more aspects of the disclosure, an improved online concierge system may receive inquiries from users and may use machine learning to automatically route the inquiries to proper entities, such as shoppers with domain expertise and/or retailers that are likely to carry items associated with the users' inquiries.

A customer may have a dedicated problem in mind, and requires assistance from either a store associate or a subject matter expert for a particular use case related to a product which the customer intends to purchase. The improved online concierge system described herein leverages the delivery capabilities of a network of shoppers, which will allow customers to present shoppers with a general problem (through means of text, or image, text), and let the shopper make an educated suggestion using products available through the online concierge system's product catalog, and additionally leveraging the in-store associate knowledge base to further guide the customer to the right products.

In some embodiments, a customer can take a picture of the problem or item which they need information on. A shopper may receive the image, and presents the image to store associates. Store associates may suggest products to the shopper or the customer. Additionally, the store may receive the image directly through a kiosk, or any other types of client device, and respond directly to the customer or the shopper. A retail associate in the store may be able to be compensated based on a count of assistance provided. The retail associate may also provide recommendations for add-ons, warranties, substitutes, etc. to the customer or shopper. In some embodiments, additional communication or information may be desired from the customer, and a retail associate or the customer may initiate a video call through the online concierge system.

For example, a customer has a lawn with patches. The customer takes pictures of patches and presents them to the online concierge system. In some embodiments, the online concierge system provides the photos to a store. A retail associate at the store provides recommended products based on their subject matter expertise. The shopper may then go in to buy the products on behalf of the customer, such that the retail associate enhances the services provided by the shopper and the online concierge system.

As another example, the improved online concierge system allows shoppers to respond to general inquiries that are supported by retail associates if necessary. For example, a customer may ask "how ripe are the fruits I am buying?" A shopper may not know, but a retail associate would know. The online concierge system will automatically suggest routing the question to a store, or suggest responses based on the online concierge system's understanding of the store, which may be based on previous communications received from a retail associate.

As yet another example, a customer has an inquiry about a product, asking the online concierge system. A shopper may respond to the inquiry directly, or handoff the inquiry to a retail associate at a store if the shopper does not have an answer. The store will have a means to respond to inquiries. In some embodiments, the store causes the retail associate's response to be communicated through the shopper to the customer. Alternatively, the store may have a dedicated group of people trained for providing responses to customers directly.

The online concierge system provides a means for customers to send inquiries through a user interface within a website or a mobile application, which may include an option to provide a photo. In some embodiments, the online concierge system will be responsible for determining the order of operations in which the inquiry will take place from the customer, to either a potential shopper or a retail associate.

In some embodiments, when an inquiry is sent prior to an order being placed, the inquiries will be directed to a retailer, which may respond directly to the customer. Upon an inquiry including a photo being sent, the online concierge system will use visual image recognition techniques to determine the contents of the images, such as a probability of the image content objects, landscape, location, etc., and correlate the terms determined of the image contents to search queries that are commonly used in reference to specific stores, such that the correct store of relevance is contacted for the customer inquiry.

For example, a customer submits an image of a lawn to the online concierge system. The online concierge system determines that the image is applicable to "lawn care." The online concierge system routes the customer inquiry to a home improvement store's garden center based on the relevance score provided by image recognition. When an order is placed, the online concierge system will direct the inquiry to the right associate within the store based on the department which the associate works in. In some embodiments, the online concierge system will also direct to an appropriate store based on prior shopping or purchase which the customer has made. The online concierge system will intelligently determine if the inquiry should go to a store, or be escalated to a retailer's corporate level.

When an inquiry arrives after an order is placed, the inquiry is directed to a shopper within a store (during their shop). The online concierge system will guide the shopper through the store to the right person or department to attempt to respond to the inquiry. In the case that a shopper is not able to satisfy the response for the inquiry provided, the shopper may delegate the question to another shopper to help each other in supporting customer inquiries. As such, a network of shoppers available as subject matter experts is created when retail associates may not be present.

In some cases, shoppers may be unable to directly answer an inquiry from a customer due to insufficient information, expertise, etc. In some embodiments, the online concierge system will aid the shopper to support the customer by handling redirects of the inquiry from the shopper through an escalation route. In this event, the shopper may be given an option to redirect the inquiry to another shopper in the immediate vicinity with a higher expertise score for the particular question, or route directly to a retail associate within the store the shopper is in. The expertise score of shoppers may be used to help guide the shopper to another shopper who will be able to answer the inquiry, based on expertise and probability of a successful response.

Over time, shoppers will accumulate sufficient responses to inquires which will aggregate into a shopper expertise score. In some embodiments, during onboarding (and following onboarding throughout their shops), each shopper may be provided a brief questionnaire asking for areas of expertise that they can support in. Shoppers who claim they have knowledge of a top will be built into the matching algorithm for inquiries which ensures the shopper is the one receiving the communications.

A shopper may be considered an "expert" in a domain and granted the ability to recommend products based on their knowledge. The shopper may also be granted some commissions based on upsells performed by the retailer. Retailers and stores may also benefit from the joint service provided by the online concierge system. For example, the joint service will create trust in recommendations from shoppers given their expertise, and build shopper engagement, incentivizing for accurate conversations. The online concierge system will ultimately provide better service to all its customers and increase upswell possibilities.

In some embodiments, an inquiry may be given a survey at an end of its completion, where the customer may respond to the helpfulness of the shopper. The result will aid in the calculation of the shopper's updated expertise score and is used in the probability calculation to determine a successful answer to be provided by a potential shopper in the future.

In some embodiments, a model used to calculate the expertise score may be an aggregated map of multiple inputs, including (but not limited to) (1) expertise of topic or category within the grocery delivery system's index based on manual survey input, (2) prior successful batches completed for a particular store, (3) prior successful batches completed for a particular category, (3) how often the shopper picks up orders with a particular product, or a particular category of product, (4) how often successful shopper recommendations are approved, such as recommending correct fuses by amperage, wiring by design, etc, (5) how often the shopper completes shops for orders at a particular retailer, such as based on aggregate information of the above inputs, draw an inference to volunteer the shopper as an expert for the retailer, and/or departments therein, etc.

In some embodiments, a ranking will be applied for each of the above inputs, which are cross-correlated with other shoppers. Shoppers will then be requested upon to provide answers for inquires if their ranking is higher than threshold of successful responses from the retailer's sales associates. This ensures quality responses from shoppers, and general reliability in the shopper base' answers.

Additional details about the improved online concierge system are further described below with respect to FIGS. 1-6.

System Architecture

FIG. 1 is a block diagram of a system environment 100 in which an online system, such as an online concierge system 102 as further described below in conjunction with FIGS. 2 and 3, operates. In addition to the online concierge system 102, system environment 100, shown in FIG. 1, further comprises one or more client devices, such as user client device 110, shopper client device 150, and retailer client devices 160. The system environment 100 also includes one or more third-party systems, such as one or more retailer systems 130. The client devices 110, 150, 160, retailer systems 130, and online concierge system 102 are configured to communicate with each other via a network 120. In alternative configurations, different and/or additional components may be included in the system environment 100. Additionally, in other embodiments, the online concierge system 102 may be replaced by an online system configured to retrieve content for display to users and to transmit the content to one or more user client devices 110 and shopper client devices 160 for display.

The user client device 110 and shopper client device 150 are one or more computing devices capable of receiving user input as well as transmitting and/or receiving data via network 120. In one embodiment, a user client device 110 or a shopper client device 150 is a computer system, such as a desktop or a laptop computer. Alternatively, a client device 110 or 160 may be a device having computer functionality, such as a personal digital assistant (PDA), a mobile telephone, a smartphone, or another suitable device. A client device 110 or 160 is configured to communicate via network 120. In one embodiment, a user client device 110 or a shopper client device 150 executes an application allowing a user of the corresponding device to interact with the online concierge system 102. For example, the user client device 110 executes a customer mobile application 206, and the shopper client device 150 executes a shopper mobile application 212, as further described below in conjunction with FIGS. 5A and 5B, respectively, to enable interaction among the user client device 110, the shopper client device 150, and the online concierge system 102. As another example, a user client device 110 or a shopper client device 150 executes a browser application to enable interaction among the user client device 110, the shopper client device 150, and the online concierge system 102 via the network 120. In another embodiment, the user client device 110 or the shopper client device 150 interacts with the online concierge system 102 through an application programming interface (API) running on a native operating system of the user client device 110 or shopper client device 150, such as IOS® or ANDROID™.

User client device 110 includes one or more processors 112 configured to control operation of the user client device 110 by performing functions. In various embodiments, user client device 110 includes a memory 114 comprising a non-transitory storage medium on which instructions are encoded. The memory 114 may have instructions encoded thereon that, when executed by the processor 112, cause the processor to perform functions to execute the customer mobile application 206 to provide the functions further described above in conjunction with FIG. 5A. Similarly, shopper client device 150 also includes one or more processors and a memory (not shown). The memory may have instructions encoded thereon that, when executed by the processor, cause the processor to perform functions to execute the shopper mobile application 212 to provide the functions further described below in conjunction with FIG. 5B.

The retailer system 130 is an online system of a retailer that is associated with the online concierge system 102. In some embodiments, the retailer system 130 includes an inventory system that maintains inventories available at the retailer. In some embodiments, the retailer system 130 allows users or retailer representatives to access the inventory data via a client device, such as a retailer client device 160 or a shopper client device 150. In some embodiments, a user may be allowed to enter an inquiry at shopper client device 150 via a retailer mobile application or a browser. Responsive to receiving the inquiry, the retailer system 130 passes the inquiry to the retailer client device 160, which may be a kiosk installed at the retailer premise, or a mobile device of a retailer representative.

The user client device 110, shopper client device 150, and/or retailer client device 160 (collectively referred to as "client devices") are configured to communicate with each other via the network 120. Network 120 may comprise any combination of local area and/or wide area networks, using both wired and/or wireless communication systems. In one embodiment, network 120 uses standard communications technologies and/or protocols. For example, network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over network 120 may be represented using any suitable format, such as hypertext markup language (HTML) or extensible markup language (XML). In some embodiments, all or some of the communication links of network 120 may be encrypted using any suitable technique or techniques.

The online concierge system 102 includes one or more processors 142 configured to control operation of the online concierge system 102 by performing functions. In various embodiments, the online concierge system 102 includes a memory 144 comprising a non-transitory storage medium on which instructions are encoded. The memory 144 may have instructions encoded thereon corresponding to the modules further below in conjunction with FIG. 3 that, when executed by the processor 142, cause the processor to perform the functionality further described below in conjunction with FIGS. 2-6. For example, memory 144 has instructions encoded thereon that, when executed by processor 142, cause processor 142 to receive an inquiry from a user client device 110. The inquiry includes text content and an image. The processor 142 is also caused to use a natural language model to analyze the received text content to identify a first category of items, and apply the received image to an image recognition model trained to identify a second category of items contained in the received image. Processor 142 then identifies a retailer that carries items in at least one of the first or second category of items, and suggests the retailer to the user.

Additionally, the online concierge system 102 includes a communication interface configured to connect the online concierge system 102 to one or more networks, such as network 120, or to otherwise communicate with devices (e.g., client devices 110, 150, and retailer system 130) connected to the one or more networks.

Each client device 110, 150, 160, third party system 130, or the online concierge system 102 may be one or more special-purpose computing devices (such as a kiosk at a retailer) or generic computing devices (such as a mobile phone) configured to perform specific functions, as further described below in conjunction with FIGS. 2-6, and may include specific computing components such as processors, memories, communication interfaces, and/or the like.

System Overview

Figure 2:
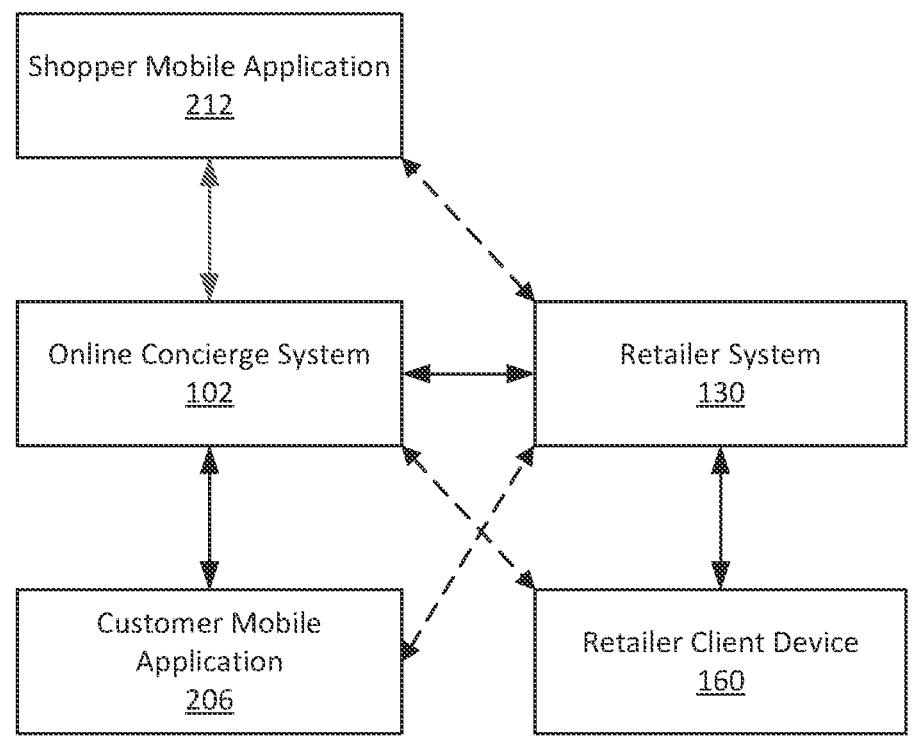
FIG. 2 illustrates an environment of an online shopping concierge service, according to one or more embodiments.

FIG. 2 illustrates an environment 200 of an online platform, such as an online concierge system 102, according to one or more embodiments. The figures use like reference numerals to identify like elements. A letter after a reference numeral, such as "210a," indicates that the text refers specifically to the element having that particular reference numeral. A reference numeral in the text without a following letter, such as "210," refers to any or all of the elements in the figures bearing that reference numeral. For example, "210" in the text refers to reference numerals "210a" or "210b" in the figures.

Environment 200 includes an online concierge system 102. The online concierge system 102 is configured to receive orders from one or more users 204 (only one is shown for the sake of simplicity). An order specifies a list of goods (items or items) to be delivered to user 204. The order also specifies the location to which the goods are to be delivered, and a time window during which the goods should be delivered. In some embodiments, the order specifies one or more retailers from which the selected items should be purchased. The user may use a customer mobile application (CMA) 206 to place the order; the CMA 206 is configured to communicate with the online concierge system 102.

The online concierge system 102 is configured to transmit orders received from users 204 to one or more shoppers 208 (only one is shown for the sake of simplicity). A shopper 208 may be a contractor, employee, another person (or entity), robot, or other autonomous device enabled to fulfill orders received by the online concierge system 102. The shopper 208 travels between a warehouse and a delivery location (e.g., the user's home or office). A shopper 208 may travel by car, truck, bicycle, scooter, foot, or other modes of transportation. In some embodiments, the delivery may be partially or fully automated, e.g., using a self-driving car.

Environment 200 also includes three warehouses 210a, 210b, and 210c (only three are shown for the sake of simplicity; the environment could include hundreds of warehouses). The warehouses 210 may be physical retailers, such as grocery stores, discount stores, department stores, etc., or non-public warehouses storing items that can be collected and delivered to users. Each shopper 208 fulfills an order received from the online concierge system 102 at one or more warehouses 210, delivers the order to the user 204, or performs both fulfillment and delivery. In one embodiment, shoppers 208 make use of a shopper mobile application 212 which is configured to interact with the online concierge system 102.

In some embodiments, the environment 200 also includes one or more retailer systems 130 (only one is shown for the sake of simplicity). The retailer system 130 may be a computer system or a server that has access to inventory databases associated with one or more affiliated warehouses 210. The retailer system 130 may also provide applications for users and/or retail associates, such that users and/or retail associates may be able to query items available at each affiliated warehouse 210 or stores, and/or communicate with each other via the applications provided by the retailer system 130.

In some embodiments, the retailer system 130 may include an interface (such as an API) that allows the online concierge system 102 to transmit user inquiries received from a customer mobile application 206 and/or a shopper mobile application 212 thereto. In some embodiments, the retailer system 130 may include an interface configured to directly receive inquiries from a customer mobile application 206 or a shopper mobile application 212. Responsive to receiving an inquiry from a customer mobile application 206 or a shopper mobile application 212, the retailer system 130 may then pass the inquiry to a retailer client device 160, which may be a kiosk in a particular store or warehouse 210 of the retailer or a mobile device of a retailer associate.

Alternatively, the online concierge system 102 may provide a retailer application that may be installed on a retailer client device 160, such that the retailer client device 160 is able to interact with the online concierge system 102 directly without the retailer system 130. For example, a kiosk at a store may include a retailer application installed thereon. The online concierge system 102 may route the user inquiries directly to the kiosk via the retailer application. In response to receiving a user inquiry from the online concierge system 102, the kiosk may be configured to generate a notification, drawing attention to retail associates at the store. Retail associates can then enter their responses to user inquiries via the retailer application.

Figure 3:
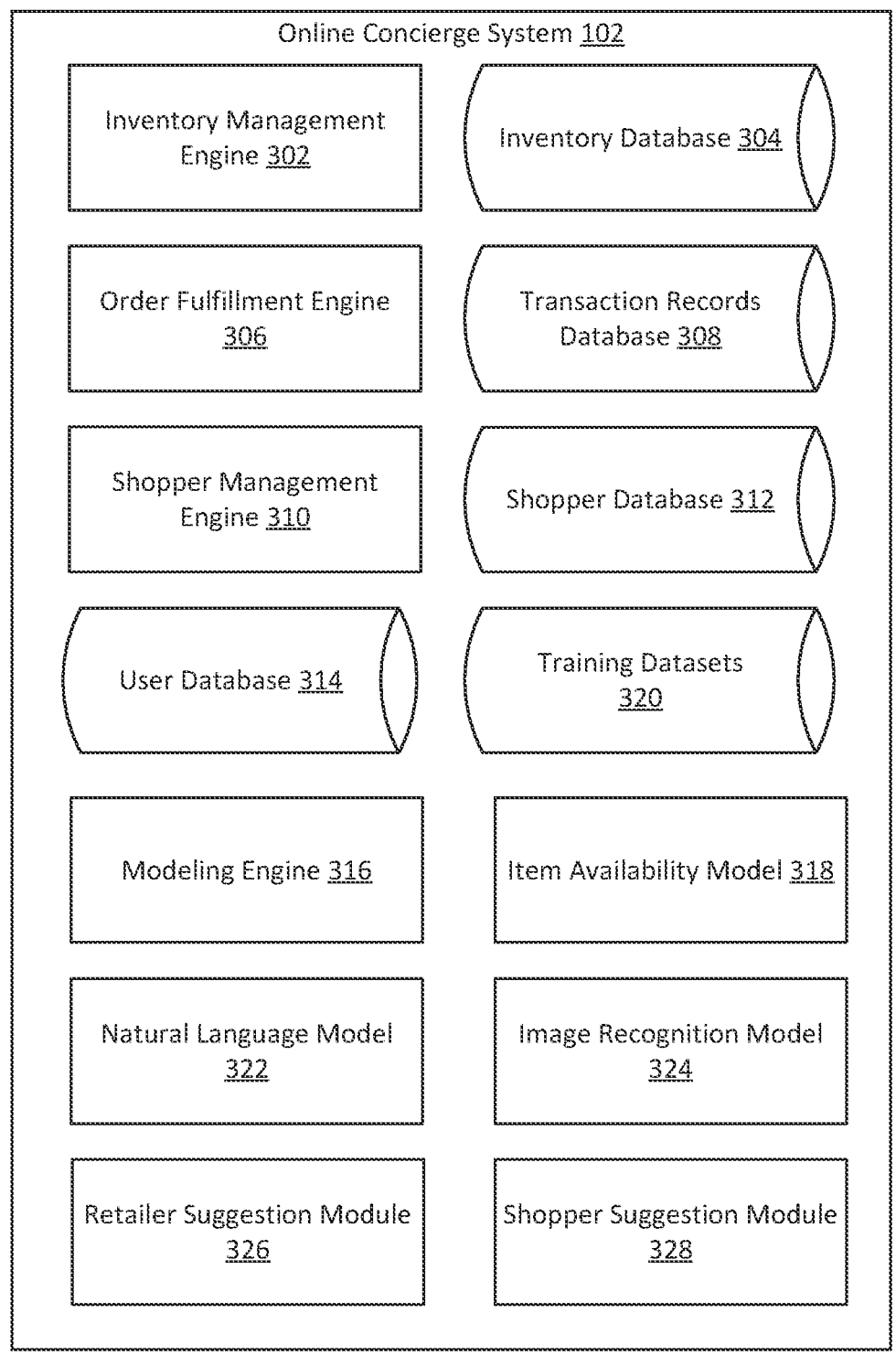
FIG. 3 is a diagram of an online concierge system, according to one or more embodiments.

FIG. 3 is a diagram of an online concierge system 102, according to one or more embodiments. In various embodiments, the online concierge system 102 may include different or additional modules than those described in conjunction with FIG. 3. Further, in some embodiments, the online concierge system 102 includes fewer modules than those described in conjunction with FIG. 3.

The online concierge system 102 includes an inventory management engine 302, which interacts with inventory systems associated with each warehouse 210. In one embodiment, the inventory management engine 302 requests and receives inventory information maintained by the warehouse 210. The inventory of each warehouse 210 is unique and may change over time. The inventory management engine 302 monitors changes in inventory for each participating warehouse 210. The inventory management engine 302 is also configured to store inventory records in an inventory database 304. The inventory database 304 may store information in separate records—one for each participating warehouse 210—or may consolidate or combine inventory information into a unified record. Inventory information includes attributes of items that include both qualitative and qualitative information about items, including size, color, weight, SKU, serial number, and so on. In one embodiment, the inventory database 304 also stores purchasing rules associated with each item, if they exist. For example, age-restricted items such as alcohol and tobacco are flagged accordingly in the inventory database 304. Additional inventory information useful for predicting the availability of items may also be stored in the inventory database 304. For example, for each item-warehouse combination (a particular item at a particular warehouse), the inventory database 304 may store a time that the item was last found, a time that the item was last not found (a shopper looked for the item but could not find it), the rate at which the item is found, and the popularity of the item.

For each item, the inventory database 304 identifies one or more attributes of the item and corresponding values for each attribute of an item. For example, the inventory database 304 includes an entry for each item offered by a warehouse 210, with an entry for an item including an item identifier that uniquely identifies the item. The entry includes different fields, with each field corresponding to an attribute of the item. A field of an entry includes a value for the attribute corresponding to the attribute for the field, allowing the inventory database 304 to maintain values of different categories for various items.

In various embodiments, the inventory management engine 302 maintains a taxonomy of items offered for purchase by one or more warehouses 210. For example, the inventory management engine 302 receives an item catalog from a warehouse 210 identifying items offered for purchase by the warehouse 210. From the item catalog, the inventory management engine 302 determines a taxonomy of items offered by the warehouse 210. different levels in the taxonomy providing different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.), with the category. Thus, the taxonomy maintains associations between a category and specific items offered by the warehouse 210 matching the category. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels in the taxonomy include less detail about items, so greater numbers of items are included in higher levels (e.g., higher levels include a greater number of items satisfying a broader category). Similarly, lower levels in the taxonomy include greater detail about items, so fewer numbers of items are included in the lower levels (e.g., higher levels include a fewer number of items satisfying a more specific category). The taxonomy may be received from a warehouse 210 in various embodiments. In other embodiments, the inventory management engine 302 applies a trained classification module to an item catalog received from a warehouse 210 to include different items in levels of the taxonomy, so application of the trained classification model associates specific items with categories corresponding to levels within the taxonomy.

The online concierge system 102 also includes an order fulfillment engine 306 which is configured to synthesize and display an ordering interface to each user 204 (for example, via the customer mobile application 206). The order fulfillment engine 306 is also configured to access the inventory database 304 in order to determine which items are available at which warehouse 210. The order fulfillment engine 306 may supplement the item availability information from the inventory database 304 with an item availability predicted by the item availability model 318. The order fulfillment engine 306 determines a sale price for each item ordered by a user 204. Prices set by the order fulfillment engine 306 may or may not be identical to in-store prices determined by retailers (which is the price that users 204 and shoppers 208 would pay at the retail warehouses). The order fulfillment engine 306 also facilitates transactions associated with each order. In one embodiment, the order fulfillment engine 306 charges a payment instrument associated with a user 204 when he/she places an order. The order fulfillment engine 306 may transmit payment information to an external payment gateway or payment processor. The order fulfillment engine 306 stores payment and transactional information associated with each order in a transaction records database 308.

In various embodiments, the order fulfillment engine 306 generates and transmits a search interface to a client device of a user for display via the customer mobile application 206. The order fulfillment engine 306 receives a query comprising one or more terms from a user and retrieves items satisfying the query, such as items having descriptive information matching at least a portion of the query. In various embodiments, the order fulfillment engine 306 leverages item embeddings for items to retrieve items based on a received query. For example, the order fulfillment engine 306 generates an embedding for a query and determines measures of similarity between the embedding for the query and item embeddings for various items included in the inventory database 304.

In some embodiments, the order fulfillment engine 306 also shares order details with warehouses 210. For example, after successful fulfillment of an order, the order fulfillment engine 306 may transmit a summary of the order to the appropriate warehouses 210. The summary may indicate the items purchased, the total value of the items, and in some cases, an identity of the shopper 208 and user 204 associated with the transaction. In one embodiment, the order fulfillment engine 306 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 306, which provides detail of all orders which have been processed since the last request.

The order fulfillment engine 306 may interact with a shopper management engine 310, which manages communication with and utilization of shoppers 208. In one embodiment, the shopper management engine 310 receives a new order from the order fulfillment engine 306. The shopper management engine 310 identifies the appropriate warehouse 210 to fulfill the order based on one or more parameters, such as a probability of item availability determined by a machine-learned item availability model 318, the contents of the order, the inventory of the warehouses, and the proximity to the delivery location. The shopper management engine e10 then identifies one or more appropriate shoppers 208 to fulfill the order based on one or more parameters, such as the shoppers' proximity to the appropriate warehouse 210 (and/or to the user 204), his/her familiarity level with that particular warehouse 210, and so on. Additionally, the shopper management engine 310 accesses a shopper database 312 which stores information describing each shopper 208, such as his/her name, gender, rating, previous shopping history, and so on.

As part of fulfilling an order, the order fulfillment engine 306 and/or shopper management engine 310 may access a user database 314 which stores information describing each user. This information could include each user's name, address, gender, shopping preferences, favorite items, stored payment instruments, and so on.

In various embodiments, the order fulfillment engine 306 determines whether to delay display of a received order to shoppers for fulfillment by a time interval. In response to determining to delay the received order by a time interval, the order fulfillment engine 306 evaluates orders received after the received order and during the time interval for inclusion in one or more batches that also include the received order. After the time interval, the order fulfillment engine 306 displays the order to one or more shoppers via the shopper mobile application 212; if the order fulfillment engine 306 generated one or more batches including the received order and one or more orders received after the received order and during the time interval, the one or more batches are also displayed to one or more shoppers via the shopper mobile application 212.

Machine Learning Models

The online concierge system 102 further includes a natural language model 322, an image recognition model 324, a retailer suggestion module 326, and/or a shopper suggestion module 328. In some embodiments, the natural language model 322 is configured to process text content received from user inquiries to identify one or more first categories of items. Alternatively, or in addition, the natural language model 322 is configured to identify one or more particular items (also referred to as "first items") based on the text content received from a user inquiry. The image recognition model 324 is configured to process images received from user inquiries to identify one or more second categories of items. Alternatively, or in addition, the image recognition model 324 is configured to identify one or more particular items (also referred to as "second items") based on the image received from a user inquiry.

The retailer suggestion module 326 is configured to suggest a retailer based on the identified one or more first and/or second categories of items and/or one or more first and/or second items. The shopper suggestion module 328 is configured to suggest a shopper who is a subject matter expert based on the one or more first and second categories of items, and/or one or more first and/or second items. In some embodiments, each shopper is associated with one or more expertise scores. Each expertise score indicates a level of expertise associated with a particular category of items.

In some embodiments, the expertise scores are generated based on at least one of (1) a number of successful orders completed for a particular retailer that carries the particular category of items, (2) a frequency of successful orders completed for a particular retailer that carries the particular category of items, (3) a number of successful orders completed for the particular category, (4) a frequency of successful orders completed for the particular category, (5) a number of shopper recommendations associated with the particular category of items that are approved by users, and/or (6) a frequency of shopper recommendations associated with the particular category of items are approved by users. The expertise scores may be batch generated for all the shoppers periodically, and/or updated each time when a new order is fulfilled by a particular shopper and/or a new shopper recommendation is approved or disapproved by a user. The expertise scores may be stored in the shopper database 312.

In some embodiments, the online concierge system 102 further includes training datasets 320 and modeling engine 316 configured to train and/or fine-tune the natural language model 322 and/or the image recognition model 324. The natural language model 322 and/or the image recognition model 324 can learn from the training datasets 320, rather than follow only explicitly programmed instructions.

In some embodiments, the retailer suggestion module 326 further includes a machine-learned item-availability model 318 configured to determine a probability that an item is available at a warehouse 210 (e.g., a particular location of a retailer). The item availability model 318 may also be learned from the training datasets 320 via the modeling engine 316. The inventory management engine 302, order fulfillment engine 306, and/or shopper management engine 310 can use the item availability model 318 to determine a probability that an item is available at a warehouse 210. The item availability model 318 may be used to predict item availability for items being displayed to or selected by a user or included in received delivery orders. The machine-learned item availability model 318 may also be used to predict item availability for items identified by the natural language model 322 and/or the image recognition model 324.

In some embodiments, the retailer suggestion module 326 and the shopper suggestion module 328 are further configured to suggest a retailer or a particular store of a retailer based on item availability predicted by the item availability model 318. In some embodiments, the retailer suggestion module 326 further considers a user's profile and historical orders in suggesting a retailer. For example, a delivery address of the user may be used to suggest a retailer that is close to the delivery address. As another example, the retailer suggestion model 326 may suggest a retailer that the user has placed orders before and carries the categories of items identified by the natural language model 322 and/or image recognition model 324. The user's profile and/or historical orders may be stored in the user database 314.

Additional details about the natural language model 322, image recognition model 324, the retailer suggestion module 326, and the shopper suggestion module 328 are further discussed below with respect to FIGS. 4A-4D.

Example Process of Suggesting a Retailer or a Shopper

Figure 4A:
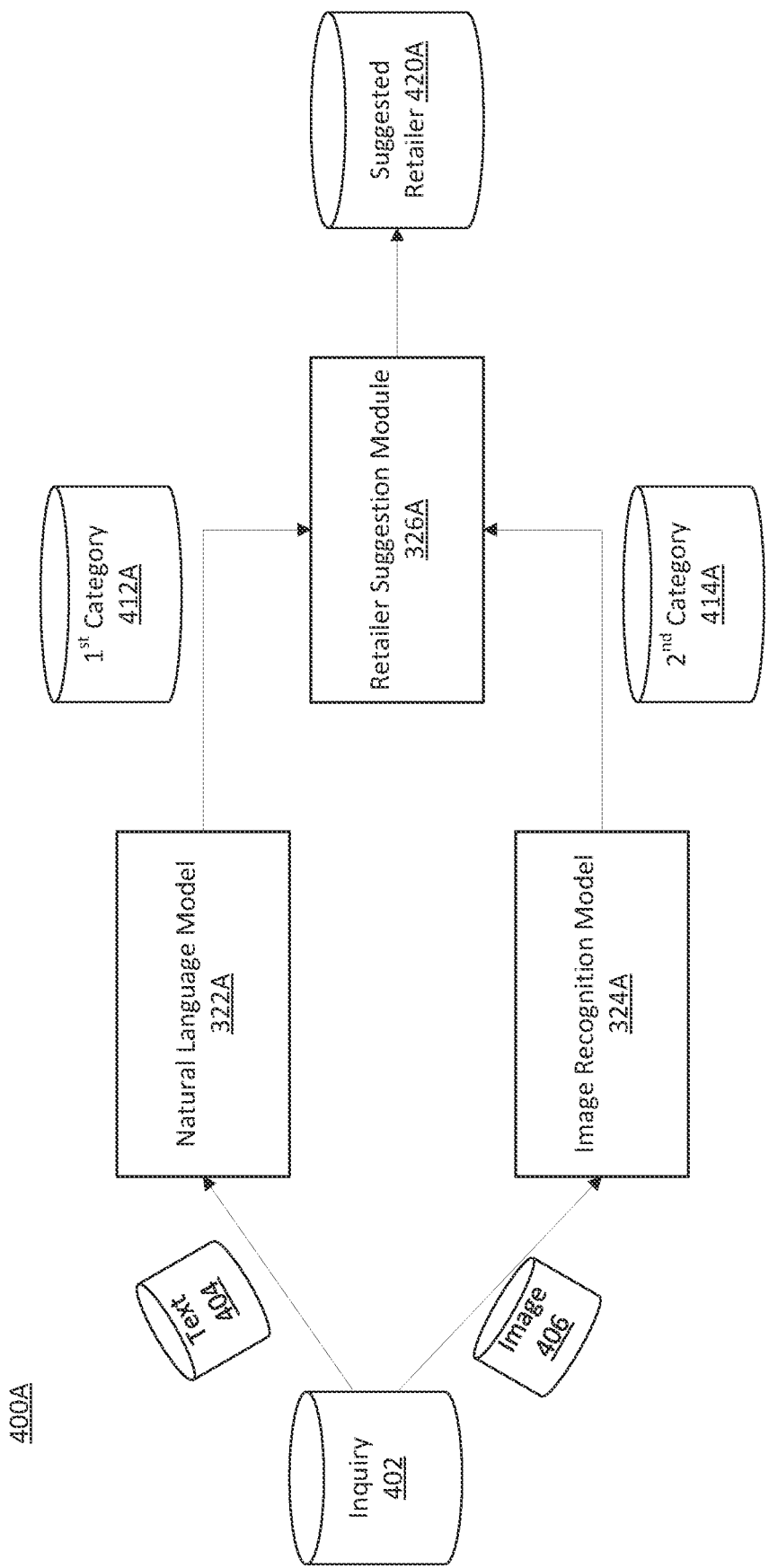
FIG. 4A is a block diagram of an example process of suggesting a retailer based on a user inquiry, according to one or more embodiments.

FIG. 4A is a block diagram of an example process 400A of suggesting retailers based on user inquiries. A user inquiry 402 may be entered by a user via a customer mobile application 206 or via a browser. The user inquiry 402 includes text content 404 and/or an image 406. The text content 404 is extracted from the user inquiry 402 and processed by the natural language model 322A, and the image 406 is extracted from the user inquiry 402 and processed by the image recognition model 324A. In particular, the natural language model 322A is trained to process the text content 404 to suggest one or more first categories 412A of items; and the image recognition model 324A is trained to process the image 406 to suggest one or more second categories 414A of items. Note, the one or more first categories 412A of items and one or more second categories 414A of items may be same, different, and/or overlap each other.

The identified one or more first categories 412A of items and one or more second categories 414A of items are then processed by the retailer suggestion model 326A. In some embodiments, the retailer suggestion model 326A communicates with the inventory management engine 302 and/or accesses inventory database 304 to identify one or more retailers that carry at least one of the one or more first categories 412A and/or second categories 414A of items. In some embodiments, the retailer suggestion module 326 may further filter identified retailers based on other information associated with the user, such as the user's location, or historical orders. In some embodiments, the retailer suggestion module 326 further rank the identified and/or filtered one or more retailers based on a plurality of parameters, such as a distance between the retailer to the user, whether the user has made an order from the retailer, whether the retailer is specialized in the categories of product that the user is likely interested in. In some embodiments, each of the plurality of parameters is assigned a weight, and the ranking is based on a weighted overall score. The retailer suggestion module 326 may then suggest one or more retailers 420A to the user based on the ranking.

For example, a user may have a lawn with patches. The user takes pictures of patches and submits an inquiry with the pictures to the online concierge system 102. The online concierge system 102 extracts the text content from the inquiry and sends the text content to the natural language model 322A, and extracts the images from the inquiry and sends the image to the image recognition model 324A. In response to receiving the text content, the natural language model 322A determines that "lawn care products" is the category that the user is likely interested in. In response to receiving the images, the image recognition model 324A also determines that "lawn care products" is the category that the user is likely interested in.

The retailer suggestion module 326A then identifies one or more retailers that carry lawn care products, such as one or more home improvement retailers and/or one or more gardening supply retailers. The retailer suggestion module 326 may also filter the identified retailers on the user's profile and/or order history. For example, if the user is located in a particular area where only a home improvement retailer is present, the retailer suggestion module 326 may suggest the home improvement retailer to the user. As another example, if the user has made an order from a gardening supply retailer in the past, the retailer suggestion module 326 may suggest the gardening supply retailer to the user.

The retailer suggestion module 326A may also rank the one or more retailers based on a plurality of parameters, such as a distance between the retailer and the user, and whether the user has made an order from the retailer in the past. For example, the distance between a first retailer and a user is 2 miles, the distance between a second retailer and a user is 10 miles, while the user has made an order including a lawn care product from the second retailer in the past, but not the first retailer. The retailer suggestion module 326 may be set to give the user's past order a greater weight, suggesting the second retailer to the user; or vice versa.

Figure 4B:
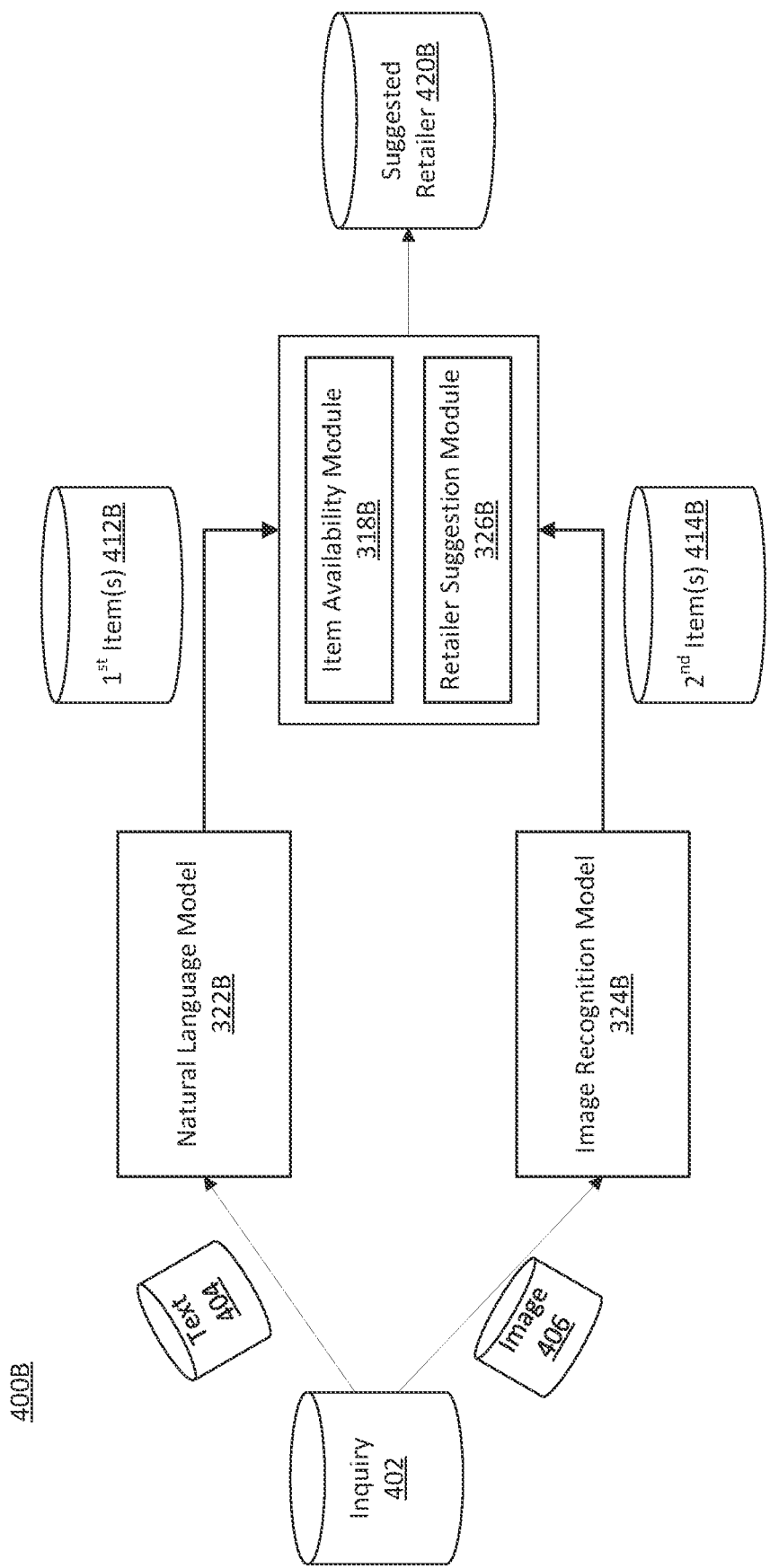
FIG. 4B is a block diagram of another example process of suggesting a retailer based on a user inquiry, according to one or more embodiments.

FIG. 4B is a block diagram of another example process 400B of suggesting retailers based on user inquiries. Similar to FIG. 4A, a user inquiry 402 includes text content 404 and an image 406. The text content 404 is processed by the natural language model 322B, and the image 406 is processed by the image recognition model 324B. Unlike FIG. 4A, in which the natural language model 322A and/or the image recognition model 324A is configured to identify categories of items, the natural language model 322B in FIG. 4B processes the text content 404 to identify one or more particular items 412B (also referred to as "first items"), and/or the natural language model 324B in FIG. 4B processes the image 406 to identify one or more particular items 414B (also referred to as "second items").

The one or more first items 412B and second items 414B are then further processed by the retailer suggesting module 326B and/or item availability module 318B. In some embodiments, the retailer suggestion module 326B first identifies one or more retailers that carry the one or more first items 412B and second items 414B. The item availability module 318B then determines whether each of the first items 412B and/or second items 414B is likely available at the identified one or more retailers. The retailer suggestion module 326B then considers the likelihood of the first items 412B and/or second items 414B being available at each identified retailer in suggesting a retailer 420B to the user.

Notably, the retailer suggestion module 326B may also consider other parameters in suggesting a retailer 420B to the user. Similar to the other parameters, the likelihood of the first items 412B and/or second items 414B being available at each identified retailer may be assigned a weight, and the identified retailers may be ranked based on an overall weighted score.

For example, the same user with lawn patches takes pictures of patches and submits an inquiry with the pictures to the online concierge system 102. The natural language model 322B determines that a few different types of grass seeds are what the user is likely interested in. In response to receiving the images, the image recognition model 324B determines that a few different types of sods are what the user is likely interested in.

The retailer suggestion module 326B then identifies one or more retailers that carry the grass seeds and sod, such as one or more home improvement retailers and/or one or more gardening supply retailers. The item availability module 318 then predicts whether each of the identified retailers is likely to have the grass seeds and sod in stock. The retailer suggestion module 326B then filters out the retailers that have a low likelihood of having the grass seeds or sod in stock. The retailer suggestion module 326B may also consider other parameters, such as a distance between the retailer and the user, whether the user has made an order from a retailer, etc. Considering all the parameters, the retailer suggestion module 326B may then suggest a retailer to the user.

Figure 4C:
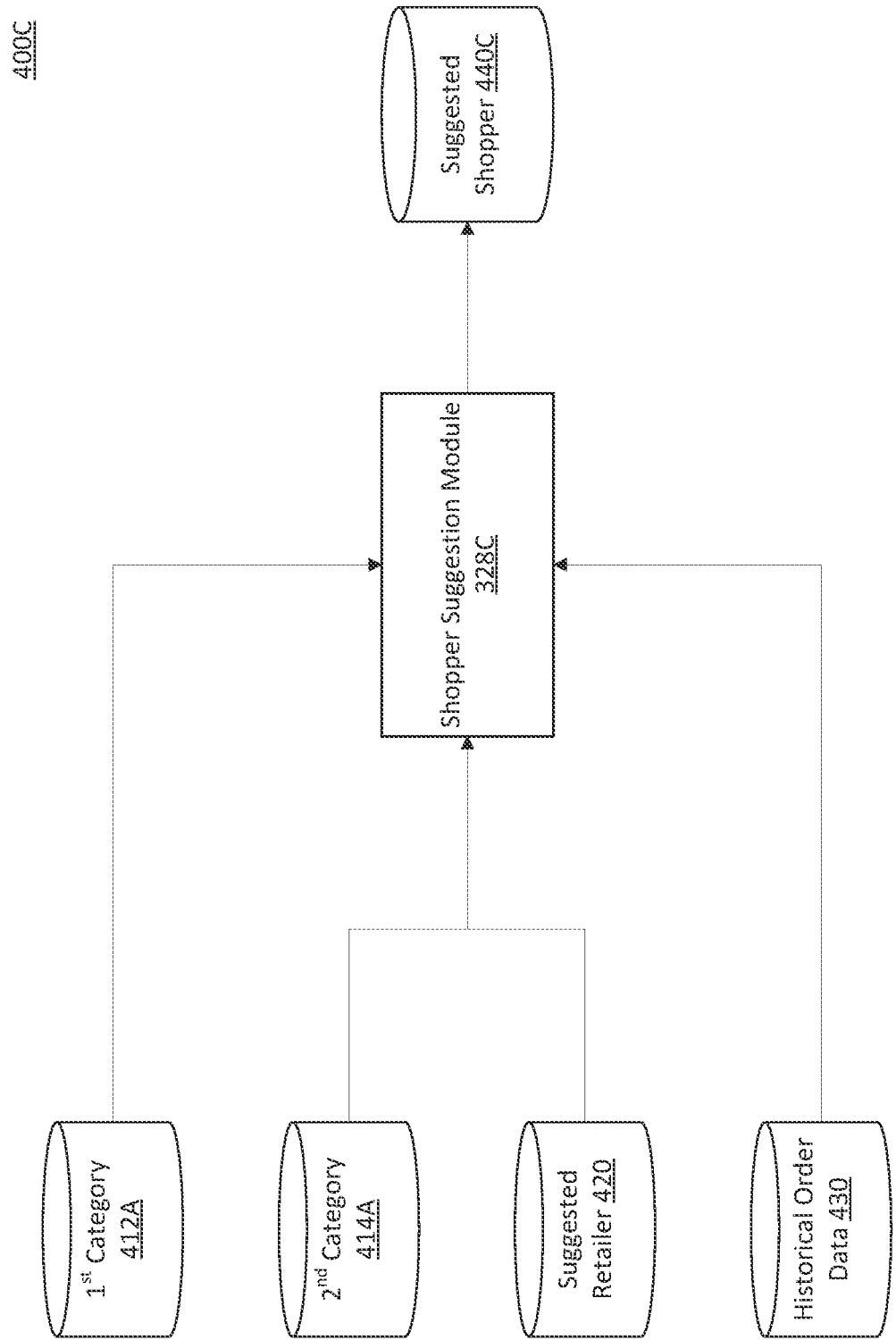
FIG. 4C is a block diagram of an example process of suggesting a shopper based on a user inquiry, according to one or more embodiments.

FIG. 4C is a block diagram of example process 400C of suggesting shoppers based on user inquiries. In some embodiments, a shopper suggestion module 328C uses the one or more first categories 412A of items (generated by the natural language model 322A of FIG. 4A), one or more second categories 414A of items (generated by the image recognition model 324A of FIG. 4A), and historical order data 430 to identify and suggest a shopper 440C. For example, the shopper suggestion module 328C may access historical order data 430 to identify one or more shoppers that have fulfilled orders including the first categories 412A and/or second categories 414A of items. The shopper suggestion module 328C may then rank the identified one or more shoppers based on the numbers of orders including the first categories 412A and/or second categories 414B of items that have been fulfilled thereby, and select one or more top ranked shoppers as the suggested shoppers 440C.

In some embodiments, the shopper suggestion module 328C also uses the suggested retailers 420 (which may be generated by the retailer suggestion module 326A of FIG. 4A or the retailer suggestion module 326B of FIG. 4B) to identify and suggest a shopper 440C. For example, the shopper suggestion module 328C may identify one or more shoppers that have fulfilled orders from the suggested retailers 420, and rank the identified shoppers based on the numbers of orders from the suggested retailers 420 that have been fulfilled thereby.

In some embodiments, the shopper suggestion module 328C considers a plurality of parameters in suggesting a shopper 440C. For example, the shopper suggestion module 328C may consider (1) a number and/or a frequency of orders that a shopper has fulfilled including the first and/or second categories 412A, 414A of items, (2) a number and/or a frequency of orders that a shopper has fulfilled from the suggested retailer 420A, (3) a number and/or a frequency of recommendations associated with the first and/or second categories 412A, 414A of items a shopper has given, and/or (4) a number and/or a frequency of recommendations associated with the first and/or second categories 412A, 414A of items that a shopper has given and that have been approved by users.

Similarly, in some embodiments, the shopper suggestion module 328C may also use one or more first items 412B (generated by the natural language model 322B), and/or one or more second items 414B (generated by the image recognition model 324B) to identify and suggest shoppers 440C. In such a case, the shopper suggestion module 328C may consider (1) a number and/or a frequency of orders that a shopper has fulfilled including the first and/or second items 412B, 414B, (2) a number and/or a frequency of orders that a shopper has fulfilled from the suggested retailer 420B, (3) a number and/or a frequency of recommendations associated with the first and/or second items 412B, 414B a shopper has given, and/or (4) a number and/or a frequency of recommendations associated with the first and/or second items 412B, 414B that a shopper has given and that have been approved by users.

Figure 4D:
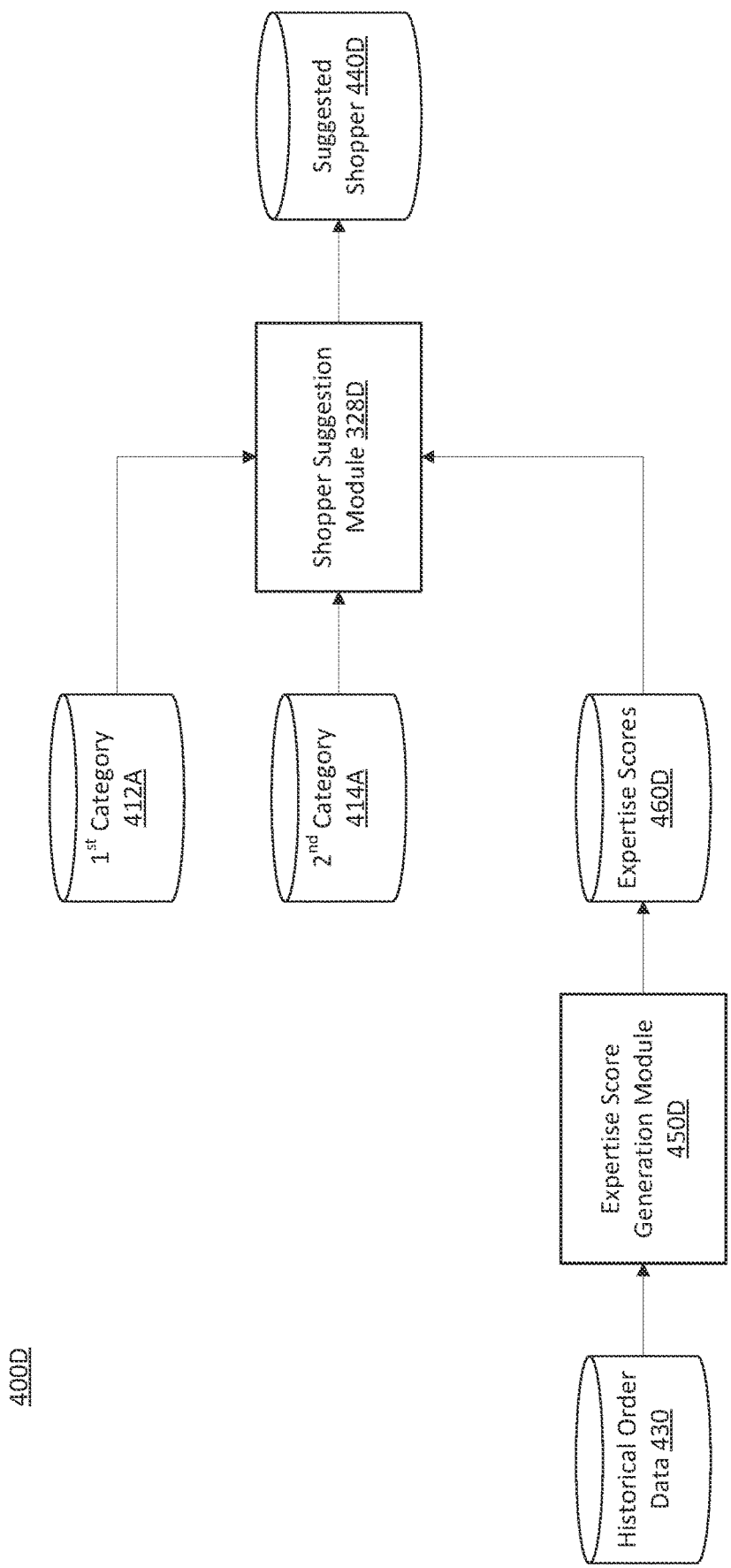
FIG. 4D is a block diagram of another example process of suggesting a shopper based on a user inquiry, according to one or more embodiments.

FIG. 4D is a block diagram of an example process 400D of suggesting shoppers based on user inquiries. As illustrated in FIG. 4D, an expertise score generation module 450D is configured to generate expertise scores 460D for shoppers based on historical order data 430. The expertise scores 460D may be generated based on (1) a number of successful orders completed for a particular retailer that carries the particular category of items, (2) a frequency of successful orders completed for a particular retailer that carries the particular category of items, (3) a number of successful orders completed for the particular category, (4) a frequency of successful orders completed for the particular category, (5) a number of shopper recommendations associated with the particular category of items that are approved by users, and/or (6) a frequency of shopper recommendations associated with the particular category of items are approved by users.

In some embodiments, the expertise score generation module 450D is part of the shopper management engine 310 of FIG. 3. In some embodiments, expertise score generation module 450D is configured to batch process the historical order data to generate expertise scores for all the shoppers initially. Subsequently, the expertise score generation module 450D is configured to periodically update the expertise scores of the shoppers based on the new orders fulfilled thereby. In some embodiments, the expertise score generation module 450D is configured to update the expertise score of a shopper, each time when the shopper successfully fulfills a new order, provides a recommendation to a shopper, or receives recommendation approval from a user.

In some embodiments, for each of a plurality of categories of items, the expertise score generation module 450D is configured to generate a separate expertise score for a shopper. For example, the plurality of categories of items may include (but are not limited to) home improvement, gardening, food product, automobile maintenance, etc. A shopper has a first expertise score associated with the home improvement category, a second expertise score associated with gardening category, a third expertise score associated with food product, a fourth expertise score associated with automobile maintenance category, etc. In some embodiments, such expertise scores (once generated) are stored in the shopper database 312 relationally to each shopper's identifier.

The shopper suggestion module 328D receives one or more first categories 412A of items (generated by the natural language model 322A) and one or more second categories 414A of items (generated by the image recognition model 324A), and identifies one or more shoppers 440D based on the expertise scores 460D of the shoppers. In some embodiments, the shopper suggestion module 328D identifies one or more shoppers with highest expertise scores associated with the first and/or second categories 412A, 414A, and suggests the identified one or more shoppers to the user. In some embodiments, the shopper suggestion module 328D may also consider additional parameters in suggesting shoppers 440D. Such additional parameters may include (but are not limited to) current availability of a shopper, the geographical location of a shopper, etc.

For example, the same user with lawn patches takes pictures of patches and submits an inquiry with the pictures to the online concierge system 102. The natural language model 322A and the image recognition model 324A both determine that "gardening products" is the category that the user is likely interested in. The shopper suggestion module 328D identifies one or more shoppers with the highest gardening expertise score, and suggests the identified shoppers to the user.

In some embodiments, the online concierge system 102 passes the user inquiry 402 to a client device of the suggested retailer 420A, 420B, and/or the suggested shopper 440C, 440D, such that a retail associate and/or the suggested shopper may be able to provide an answer or suggestion to the user. In some cases, the suggested shopper 440C may not have enough knowledge to answer the inquiry, and the suggested shopper 440C may recommend another shopper to answer the inquiry. In response to the recommendation of the other shopper, the online concierge system 102 may pass the inquiry to a client device of the other shopper. Alternatively, or in addition, the suggested shopper 440C may recommend a retailer. In response to the recommendation of the retailer, the online concierge system 102 may pass the inquiry to a retailer system 130 associated with the retailer.

In some embodiments, the online concierge system 102 passes the user inquiry to client devices of multiple shoppers 440C, 440D or multiple retailers 420A, 420B. Each of the multiple shoppers or retailers may be able to answer the same user inquiry, and more than one answer may be presented to the user.

In some embodiments, the online concierge system 102 directs the user to a webpage or an interface associated with the retailer 420A, 420B, which displays the first or second categories 412A, 414A of items and/or the first or second items 412B, 414B that are being sold by the retailer 420A, 420B, such that the user can easily place an order from the online concierge system 102.

Customer Mobile Application

Figure 5A:
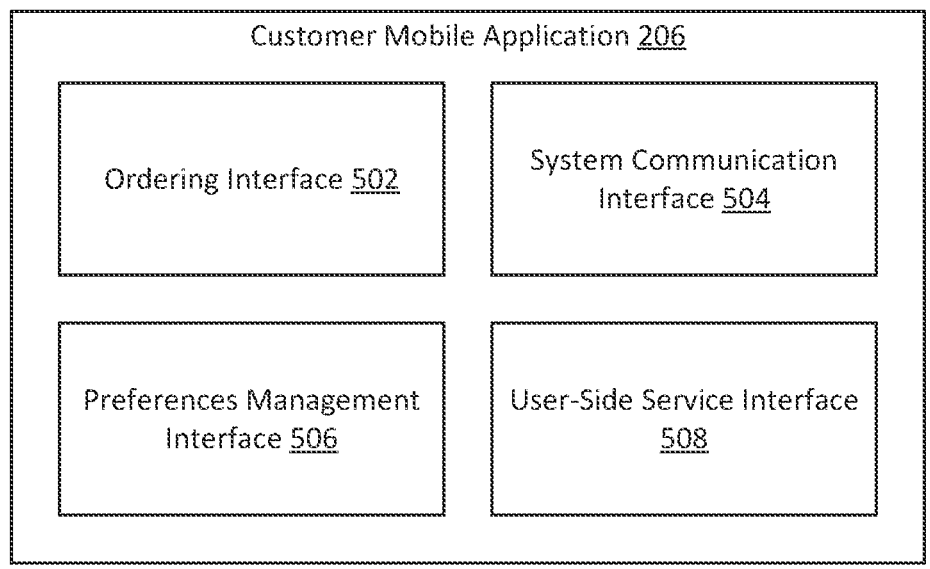
FIG. 5A is a block diagram of a customer mobile application (CMA), according to one or more embodiments.

FIG. 5A is a diagram of the customer mobile application (CMA) 206, according to one or more embodiments. The CMA 206 includes an ordering interface 502, which provides an interactive interface with which the user 204 can browse through and select items and place an order. The CMA 206 also includes a system communication interface 504 which, among other functions, receives inventory information from the online concierge system 102 and transmits order information to the system 102. The CMA 206 also includes a preferences management interface 506 which allows the user 204 to manage basic information associated with his/her account, such as his/her home address and payment instruments. The preferences management interface 506 may also allow the user to manage other details such as his/her favorite or preferred warehouses 210, preferred delivery times, special instructions for delivery, and so on.

The CMA 206 also includes a user-side service interface 508 which allows a user to enter inquiries. For example, the user-side service interface 508 allows a user to enter text content, and attach a picture with the text content. The user-side service interface 508 also allows the user to receive answers and responses associated with their inquiries. In some embodiments, in response to receiving an answer to the user's inquiry, the CMA 206 generates a notification. The user may be able to interact with the notification to view the answer. In some embodiments, the user-side service interface 508 allows the user to enter follow up inquiries to the original inquiry. In some embodiments, the user-side service interface 508 also allows the user to provide feedback to the answer, such as approval or disapproval (e.g., thumb up or thumb down), or providing a ranking (e.g., give a number of stars). Such feedback can then be used to compute or update expertise scores of the shoppers who have provided answers to user inquiries.

Shopper Mobile Application

Figure 5B:
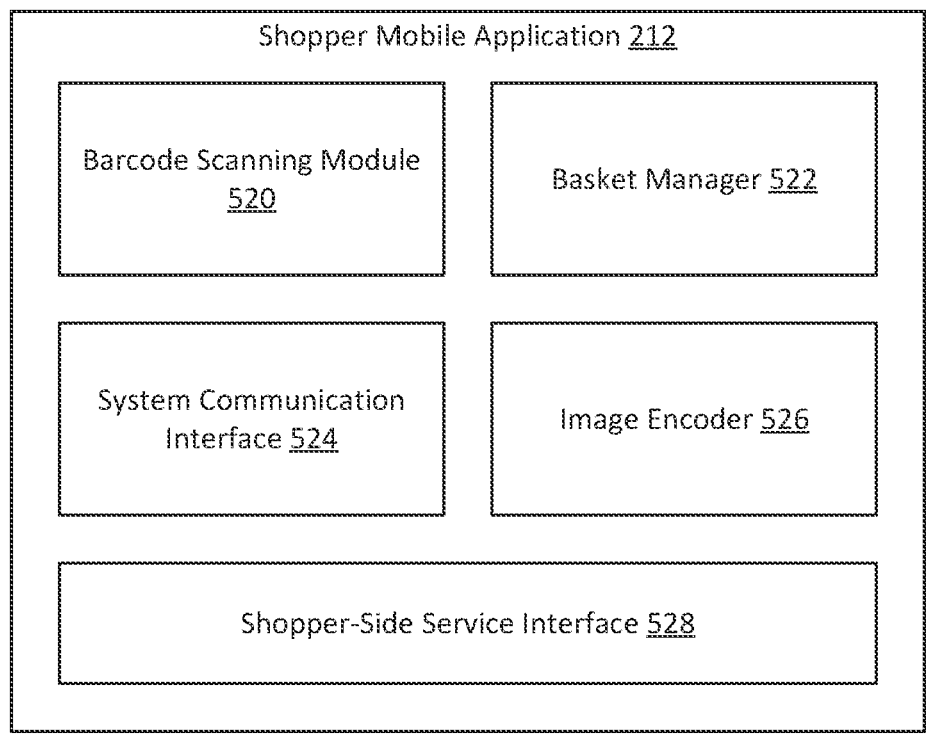
FIG. 5B is a block diagram of a shopper mobile application (SMA), according to one or more embodiments.

FIG. 5B is a diagram of the shopper mobile application (SMA) 212, according to one or more embodiments. The SMA 212 includes a barcode scanning module 520 which allows a shopper 208 to scan an item at a warehouse 210 (such as a can of soup on the shelf at a grocery store). The barcode scanning module 520 may also include an interface which allows the shopper 208 to manually enter information describing an item (such as its serial number, SKU, quantity and/or weight) if a barcode is not available to be scanned. SMA 212 also includes a basket manager 522 which maintains a running record of items collected by the shopper 208 for purchase at a warehouse 210. This running record of items is commonly known as a "basket." In one embodiment, the barcode scanning module 520 transmits information describing each item (such as its cost, quantity, weight, etc.) to the basket manager 522, which updates its basket accordingly. The SMA 212 also includes a system communication interface 524 which interacts with the online concierge system 102. For example, the system communication interface 524 receives an order from the online concierge system 102 and transmits the contents of a basket of items to the online concierge system 102. The SMA 212 also includes an image encoder 526 which encodes the contents of a basket into an image. For example, the image encoder 526 may encode a basket of goods (with an identification of each item) into a QR code which can then be scanned by an employee of the warehouse 210 at check-out.

The SMA 212 also includes a shopper-side service interface 528, which allows a shopper to receive user inquiries that are routed thereto. In some embodiments, the SMA 212 generates a notification when the shopper receives a user inquiry. In some embodiments, the shopper may be able to interact with the notification to view the user inquiry. The shopper-side service interface 528 also allows the shopper to enter an answer or response to the received user inquiry. In some embodiments, the shopper-side service interface 528 may also allow the shopper to tag a particular retailer or a particular item sold by the particular retailer in the response. In some embodiments, the shopper-side service interface 528 may also allow the shopper to suggest another shopper to answer the user inquiry. Responsive to suggesting another shopper, the online concierge system 102 reroutes the user inquiry to a shopper mobile application associated with the other shopper.

In some embodiments, the shopper-side interface 528 may also allow the shopper to suggest a retailer for answering the user inquiry. Responsive to suggesting a retailer, the online concierge system 102 reroutes the user inquiry to a retailer system 130 of the suggested retailer, which in turn routes the user inquiry to a retailer client device 160 of the retailer system 130. The retailer client device 160 may be a kiosk located at a store of the retailer, a computing device located at a user service center, and/or a mobile device carried by a retail associate.

In some embodiments, the online concierge system 102 provides a retailer application, which may be installed at a retailer client device, such that the user inquiry may be rerouted directly to the retailer client device 160 without having to go through the retailer system 130.

Example Method of Automatic Routing Customer Inquiries to Retailers or Shoppers

FIG. 6 is a flowchart of one embodiment of a method 600 for using machine learning to automatically route user inquiries to a retailer or a shopper. In various embodiments, the method includes different or additional steps than those described in conjunction with FIG. 6. Further, in some embodiments, the steps of the method may be performed in different orders than the order described in conjunction with FIG. 5. The method described in conjunction with FIG. 6 may be carried out by the online concierge system 102 in various embodiments, while in other embodiments, the steps of the method are performed by any online system capable of retrieving items, and/or transmitting communications to various client devices.

The online concierge system 102 receives 605 an inquiry from a client device (e.g., client device 110 of FIG. 1) associated with a user. The inquiry includes text content and an image. In some embodiments, the client device may have a customer mobile application (e.g., customer mobile application 206) installed thereon, and the user is able to enter inquiries via the customer mobile application. In some embodiments, no special application is required, and the user is able to use a browser to access a webpage of the online concierge system 102 to enter inquiries.

The online concierge system 102 is configured to use 610 a natural language model (e.g., natural language model 322) to analyze the received text content to identify a first category of items. The online concierge system 102 is also configured to apply 615 the received image to an image recognition model (e.g., image recognition model 324) to identify a second category of items contained in the received image.

The online concierge system 102 then identifies 620 a retailer that carries items in at least one of the first or second categories of items, and suggests 625 the retailer to the user. In some embodiments, the online concierge system 102 further routes the received inquiry to a client device of the identified retailer. In some embodiments, identifying the retailer is further based on a profile of the user. The profile of the user contains information related to historical orders made by the user, and/or a delivery address of the user.

In some embodiments, the online concierge system 102 further identifies a shopper among a plurality of shoppers based on profiles of the plurality of shoppers, and routes the received inquiry to a client device of the identified shopper. In some embodiments, the profiles of the plurality of shoppers include historical orders that the plurality of shoppers have fulfilled, and/or answers that the plurality of shoppers have provided responsive to historical inquiries from users.

In some embodiments, the profiles of the plurality of the shoppers include expertise scores associated with the first or second category of items. The online concierge system 102 is further configured to generate an expertise score associated with at least one of a plurality of categories of items. In some embodiments, the expertise score of a shopper associated with a particular category of items is generated based on at least one of (1) a number of successful orders completed for a particular retailer that carries the particular category of items, (2) a frequency of successful orders completed for a particular retailer that carries the particular category of items, (3) a number of successful orders completed for the particular category, (4) a frequency of successful orders completed for the particular category, (5) a number of shopper recommendations associated with the particular category of items that are approved by users, or (6) a frequency of shopper recommendations associated with the particular category of items are approved by users.

In some embodiments, responsive to receiving the inquiry, the identified shopper may recommend a retailer or a different shopper for answering the inquiry via a client device. Responsive to receiving a recommendation from the client device of the identified shopper, the online concierge system 102 then reroutes the received inquiry to the client device of the retailer or a client device of the different shopper, such that a retail associate or the different shopper may now be able to review and answer the inquiry.

ADDITIONAL CONSIDERATIONS

The foregoing description of the embodiments of the invention has been presented for the purpose of illustration; it is not intended to be exhaustive or to limit the invention to the precise forms disclosed. Any modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program item comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a computing device selectively activated or reconfigured by a computer program stored in the computer. Such a computer program may be stored in a tangible computer readable storage medium, which includes any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program item or other data combination described herein. The computer data signal is an item that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising, at a computer system comprising a processor and a computer-readable medium:
   receiving an inquiry from a client device associated with a user, the inquiry comprising text content and an image;
   using a natural language model to analyze the received text content to identify a first category of items;

applying the received image to an image recognition model to identify a second category of items contained in the received image;

identifying a retailer that carries items in at least one of the first or second category of items by applying an item availability model to the first or second category of items of a plurality of retailers, wherein the item availability model is trained using historical inventory records from the plurality of retailers;

in response to identifying the retailer that carries the items in the at least one of the first or second category of items, sending, to the client device associated with the user, suggestion information that causes the client device associated with the user to display one or more user interfaces that suggest the retailer to the user;

identifying a shopper associated with the retailer who is a subject matter expert in the first or second category of items based on an expertise score of the shopper, wherein the expertise score of the shopper is determined by applying a shopper expertise model trained using data associated with historical orders completed by the shopper, the shopper expertise model is trained by accessing data about a plurality of shoppers labeled with expertise scores, the data about each of the plurality of shoppers including data about historical orders completed by the shopper, the historical orders including items in the first or second category;

applying parameters of the shopper expertise model to the data about each of the plurality of shoppers to predict an expertise score; and in response to the predicted expertise score differing from the labeled expertise score, adjusting the parameters of the shopper expertise model to reduce the difference between the labeled expertise score and the predicted expertise score; and in response to identifying the shopper associated with the retailer who is a subject matter expert of the first or second category of items, transmitting the user's inquiry to the shopper's client device for display, thereby enabling direct communication between the user and the shopper.

2. The method of claim 1, further comprising:
using the natural language model to analyze the received text content to identify one or more first items in the first category of items; and
applying the received image to the image recognition model to identify one or more second items in the second category of items, wherein identification of the retailer is further based on the one or more first items or the one or more second items.

3. The method of claim 2, further comprising:
using a machine-learning item availability model to predict a likelihood of the one or more first items or one or more second items being available at the retailer;
selecting a retailer with a higher likelihood of the one or more first items or one or more second items being available; and
routing the received inquiry to a client device of the selected retailer.

4. The method of claim 2, further comprising:
selecting a retailer that is within a predetermined distance from a delivery address of the user; and
routing the received inquiry to a client device of the selected retailer.

5. The method of claim 1, further comprising:
selecting a retailer that the user has historically made an order with based on a profile of the user;
routing the received inquiry to a client device of the selected retailer.

6. The method of claim 1, further comprising:
identifying a shopper among a plurality of shoppers based on profiles of the plurality of shoppers; and
routing the received inquiry to a client device of the identified shopper.

7. The method of claim 6, further comprising:
receiving a recommendation from the client device of the identified shopper, recommending the retailer; and
responsive to the recommendation, rerouting the received inquiry to the client device of the retailer.

8. The method of claim 6, further comprising:
receiving a recommendation from the client device of the identified shopper, recommending a second shopper; and
responsive to the recommendation, rerouting the received inquiry to a client device of the second shopper.

9. The method of claim 6, wherein the profiles of the plurality of shoppers include (1) historical orders that the plurality of shoppers have fulfilled, or (2) answers that the plurality of shoppers have provided responsive to historical inquiries from users.

10. The method of claim 6, wherein the profiles of the plurality of the shoppers include expertise scores associated with the first or second category of items.

11. The method of claim 10, further comprising:
for each of the plurality of shoppers,
    generating an expertise score associated with at least one of a plurality of categories of items; and
    storing the expertise score in a shopper information database, the expertise score being stored relationally with other shopper information of the corresponding shopper.

12. The method of claim 11, wherein the expertise score of a shopper associated with a particular category of items is generated based on at least one of (1) a number of successful orders completed for a particular retailer that carries the particular category of items, (2) a frequency of successful orders completed for a particular retailer that carries the particular category of items, (3) a number of successful orders completed for the particular category, (4) a frequency of successful orders completed for the particular category, (5) a number of shopper recommendations associated with the particular category of items that are approved by users, or (6) a frequency of shopper recommendations associated with the particular category of items are approved by users.

13. A computer program item comprising a non-transitory computer readable storage medium having instructions encoded thereon that, when executed by a processor of a computing system, cause the computing system to:
receive an inquiry from a client device associated with a user, the inquiry comprising text content and an image;
use a natural language model to analyze the received text content to identify a first category of items;
apply the received image to an image recognition model to identify a second category of items contained in the received image;
identify a retailer that carries items in at least one of the first or second category of items by applying an item availability model to the first or second category of items of a plurality of retailers, wherein the item availability model is trained using historical inventory records from the plurality of retailers;

in response to identifying the retailer that carries the items in the at least one of the first or second category of items, send, to the client device associated with the user, suggestion information that causes the client device associated with the user to display one or more user interfaces that suggest the retailer to the user;

identify a shopper associated with the retailer who is a subject matter expert in the first or second category of items based on an expertise score of the shopper, wherein the expertise score of the shopper is determined by applying a shopper expertise model trained using data associated with historical orders completed by the shopper, the shopper expertise model is trained by accessing data about a plurality of shoppers labeled with expertise scores, the data about each of the plurality of shoppers including data about historical orders completed by the shopper, the historical orders including items in the first or second category;

applying parameters of the shopper expertise model to the data about each of the plurality of shoppers to predict an expertise score; and in response to the predicted expertise score differing from the labeled expertise score, adjusting the parameters of the shopper expertise model to reduce the difference between the labeled expertise score and the predicted expertise score; and in response to identifying the shopper associated with the retailer who is a subject matter expert of the first or second category of items, transmit the user's inquiry to the shopper's client device for display, thereby enabling direct communication between the user and the shopper.

14. The non-transitory computer readable storage medium of claim 13, the instructions further causing the computing system to:
route the received inquiry to a client device of the identified retailer.

15. The non-transitory computer readable storage medium of claim 13, wherein identifying the retailer is further based on a profile of the user, the profile of the user containing information related to historical orders made by the user, or a delivery address of the user.

16. The non-transitory computer readable storage medium of claim 13, the instructions further causing the computing system to:
use a machine-learning item availability model to predict a likelihood of the one or more first items or one or more second items being available at the retailer;
select a retailer with a higher likelihood of the one or more first items or one or more second items being available; and
route the received inquiry to a client device of the selected retailer.

17. The non-transitory computer readable storage medium of claim 13, the instructions further causing the computing system to:
select a retailer that is within a predetermined distance from a delivery address of the user; and
route the received inquiry to a client device of the selected retailer.

18. The non-transitory computer readable storage medium of claim 17, the instruction further causing the computing system to:
for each of a plurality of shoppers,
generating an expertise score associated with at least one of a plurality of categories of items; and
storing the expertise score in a shopper information database, the expertise score being stored relationally with other shopper information of the corresponding shopper.

19. The non-transitory computer readable storage medium of claim 18, wherein the expertise score of a shopper associated with a particular category of items is generated based on at least one of (1) a number of successful orders completed for a particular retailer that carries the particular category of items, (2) a frequency of successful orders completed for a particular retailer that carries the particular category of items, (3) a number of successful orders completed for the particular category, (4) a frequency of successful orders completed for the particular category, (5) a number of shopper recommendations associated with the particular category of items that are approved by users, or (6) a frequency of shopper recommendations associated with the particular category of items are approved by users.

20. A computing system comprising:
a processor; and
a non-transitory computer readable storage medium having instructions encoded thereon that, when executed by the processor, cause the computing system to:
receive an inquiry from a client device associated with a user, the inquiry comprising text content and an image;
use a natural language model to analyze the received text content to identify a first category of items;
apply the received image to an image recognition model to identify a second category of items contained in the received image;
identify a retailer that carries items in at least one of the first or second category of items by applying an item availability model to the first or second category of items of a plurality of retailers, wherein the item availability model is trained using historical inventory records from the plurality of retailers;
in response to identifying the retailer that carries the items in the at least one of the first or second category of items, send, to the client device associated with the user, suggestion information that causes the client device associated with the user to display one or more user interfaces that suggest the retailer to the user;
identify a shopper associated with the retailer who is a subject matter expert in the first or second category of items based on an expertise score of the shopper, wherein the expertise score of the shopper is determined by applying a shopper expertise model trained using data associated with historical orders completed by the shopper, the shopper expertise model is trained by
accessing data about a plurality of shoppers labeled with expertise scores, the data about each of the plurality of shoppers including data about historical orders completed by the shopper, the historical orders including items in the first or second category;
applying parameters of the shopper expertise model to the data about each of the plurality of shoppers to predict an expertise score; and
in response to the predicted expertise score differing from the labeled expertise score, adjusting the parameters of the shopper expertise model to reduce the difference between the labeled expertise score and the predicted expertise score; and in response to identifying the shopper associated with the retailer who is a subject matter expert of the first or second category of items, transmit the user's inquiry to the shopper's client device for display, thereby enabling direct communication between the user and the shopper.

* * * * *